United States Patent [19]
Lüssi et al.

[11] Patent Number: 5,316,781
[45] Date of Patent: May 31, 1994

[54] BREWING DEVICE FOR A COFFEE MACHINE AND METHOD OF PRODUCING COFFEE

[75] Inventors: André Lüssi; Hans Zurbuchen, both of Wabern; Jürg von Gunten, Grosshöchstetten, all of Switzerland

[73] Assignee: Sintra Holding AG, Switzerland

[21] Appl. No.: 30,219

[22] PCT Filed: Jul. 28, 1992

[86] PCT No.: PCT/CH92/00155
§ 371 Date: Mar. 25, 1993
§ 102(e) Date: Mar. 25, 1993

[87] PCT Pub. No.: WO93/02605
PCT Pub. Date: Feb. 18, 1993

[51] Int. Cl.$^5$ .................. A47J 31/00; A23F 5/00
[52] U.S. Cl. .................. 426/433; 99/287; 99/289 R
[58] Field of Search .......... 99/287, 289 R, 300, 99/302 R, 302 P; 426/433

[56] References Cited

U.S. PATENT DOCUMENTS

| | | | |
|---|---|---|---|
| 3,266,410 | 8/1966 | Novi et al. | 99/287 |
| 4,457,216 | 7/1984 | Dremmel | 99/287 |
| 4,796,521 | 1/1989 | Grossi | 99/287 |
| 4,797,296 | 1/1989 | Meier | 99/289 R |
| 4,993,315 | 2/1991 | Huber | 99/289 R |

FOREIGN PATENT DOCUMENTS

| | | |
|---|---|---|
| 1237399 | 9/1987 | European Pat. Off. |
| 3298547 | 5/1989 | European Pat. Off. |
| 4002415 | 5/1991 | Fed. Rep. of Germany |
| 2452905 | 10/1980 | France |
| 641030 | 2/1984 | Switzerland |
| 673083 | 2/1990 | Switzerland |

*Primary Examiner*—Robert W. Jenkins
*Attorney, Agent, or Firm*—Pearne, Gordon, McCoy & Granger

[57] ABSTRACT

The brewing device comprises a brewing cylinder (9) with a cylindrical bore (10), in which a lower piston (8) is disposed freely moveable and longitudinally displaceable. An upper piston (7) is rigidly connected to a frame (1). Parallel to the vertically disposed brewing cylinder (9) there is a drive spindle (6) which has guide means (23). A drive element (24) connected to the brewing cylinder has further guide means (25) which engage with those of the drive spindle (6). By rotating the drive spindle (6) in one or the other direction, the brewing cylinder is displaced upwards or downwards. Through a pivotable hopper (12), the coffee powder is filled into the brewing cylinder. In order to establish the quantity of coffee powder inserted, the brewing cylinder is displaced upwards under time control at least until a counter force created by the upper piston (7) via the pressed coffee powder is equivalent to the drive force of the spindle In order to permit the preferred loose brewing of the coffee powder, the brewing chamber between the two pistons (7, 8) is slightly enlarged again prior to the actual brewing process. The device is characterized in particular by its simple construction with few parts subject to wear and tear, and this simple construction is aided by the omission of end switches due to the complete time control of the drive spindle.

10 Claims, 8 Drawing Sheets

BREWING DEVICE FOR A COFFEE MACHINE AND METHOD OF PRODUCING COFFEE

BACKGROUND OF THE INVENTION

The present invention concerns a brewing device for a coffee machine comprising a vertically disposed brewing cylinder having a cylindrical bore and upper and lower pistons mounted within and closing the cylindrical bore to form a brewing chamber, the brewing cylinder and the lower piston being displaceable relative to one another and the upper piston and a process for producing coffee with the brewing device.

Coffee is prepared in automatic coffee machines according to various processes which can be divided into two basic groups. One can distinguish between a first process, in which the hot water passes through the coffee powder located in a filter solely by the force of gravity, and a second process in which the hot water is forced through the coffee powder under pressure (espresso or pressure brewing). The present invention relates in particular to last-mentioned pressure brewing process. Various devices are known in the art for carrying out this process automatically. Depending upon their area of use, e.g. in the household or in the catering industry, these prior art coffee machines differ in construction, particularly with regard to robustness, flexibility of process steps, and ease of operation and maintenance, etc.

U.S. Pat. No. 4,457,216 describes an automatic coffee machine having two pistons driven independently of each other to carry out various operations on the coffee powder inserted in the brewing chamber. These independently driven pistons make it possible to vary the order of the process steps and adapt the volume of the brewing chamber to an amount of coffee powder being processed in each instance. Hydraulic energy is used to drive the two pistons as well as other auxiliary parts, such as a device for automatically removing the leachedout coffee grinds after brewing. While the use of hydraulic drive means does allow a relatively free selection of relative motion among the individual parts, and thus a relatively free selection of the order of the process steps, the construction of the drive means is relatively time-consuming and expensive. Production of the coffee machine can be profitable only with a high rate of utilization, which is the reason why, as a rule, machines of this type remain reserved for commercial use only.

U.S. Pat. No. 4,852,472 discloses a coffee preparation device having a brewing cylinder with a cylindrical bore and two pistons, by means of which the cylindrical bore can be closed off to form a brewing chamber. The brewing cylinder and the pistons are displaceable relative to each other along the brewing cylinder axis. The brewing device is intended for horizontal operation. The outer surface of the brewing cylinder has an opening for the supply of coffee powder. The powder first falls on the inner surface of the brewing cylinder. It is only when the latter is displaced, a first piston being dragged along, past a second piston, that the previously inserted coffee powder in the reducing chamber is gradually distributed more or less uniformly over the entire cross-section. In order to obtain a layer of coffee powder with a distribution as uniform as possible between the two pistons, the coffee powder is initially pressed at a certain pressure. To this end, the second piston, acting against a spring, is disposed displaceably with respect to a fixed machine frame. The desired initial pressing pressure is reached when the second piston has compressed the spring a fixed amount. At this point the advance of the brewing cylinder is stopped and the brewing process is started. When the brewing process is finished, the brewing cylinder is driven back toward its original position. The second piston releases one end of the brewing cylinder. Depending on how the brewing cylinder moves relative to the first piston as a result of the effects of friction, the leached-out coffee powder then falls out of the brewing cylinder when the first piston has reached the brewing cylinder end released by the second piston. At the latest, this will happen when the brewing cylinder has reached the completely driven back position, after the first piston has been halted previously by a stop. The stop is designed so that when the brewing cylinder moves forward again into the filling position, the first piston is held immobile until released by the advancing brewing cylinder.

Although the coffee preparation device disclosed here is of simple construction, it does have some disadvantages. Because of the horizontal arrangement, the coffee powder must be brewed with pressing pressure so that a more or less uniform distribution over the cross-section of the brewing chamber is guaranteed and even brewing of the coffee powder is obtained. However, experience has shown that the quality of coffee brewed in loose powder form is better.

SUMMARY OF THE INVENTION

It is the object of this invention to provide a brewing device in a coffee machine and to propose a process for making coffee with thus brewing device, without the above-mentioned disadvantages. The brewing device for a coffee machine should generally be very flexible, and in particular it should allow the volume of the brewing chamber to be adapted to the amount of coffee powder processed in each instance. It should be also simplified in general, and in particular with respect to the drive means known in the prior art. The process given should allow loose brewing of the coffee powder, even if the amount of coffee powder supplied varies.

According to the present invention, this objective is achieved by using a brewing device having the claimed features and method of produced coffee having the claimed steps.

BRIEF DESCRIPTION OF THE DRAWINGS

The invention will be described in more detail below by way of example with reference to the appended drawings, in which.

DETAILED DESCRIPTION OF THE PREFERRED EMBODIMENT

Figure 1:
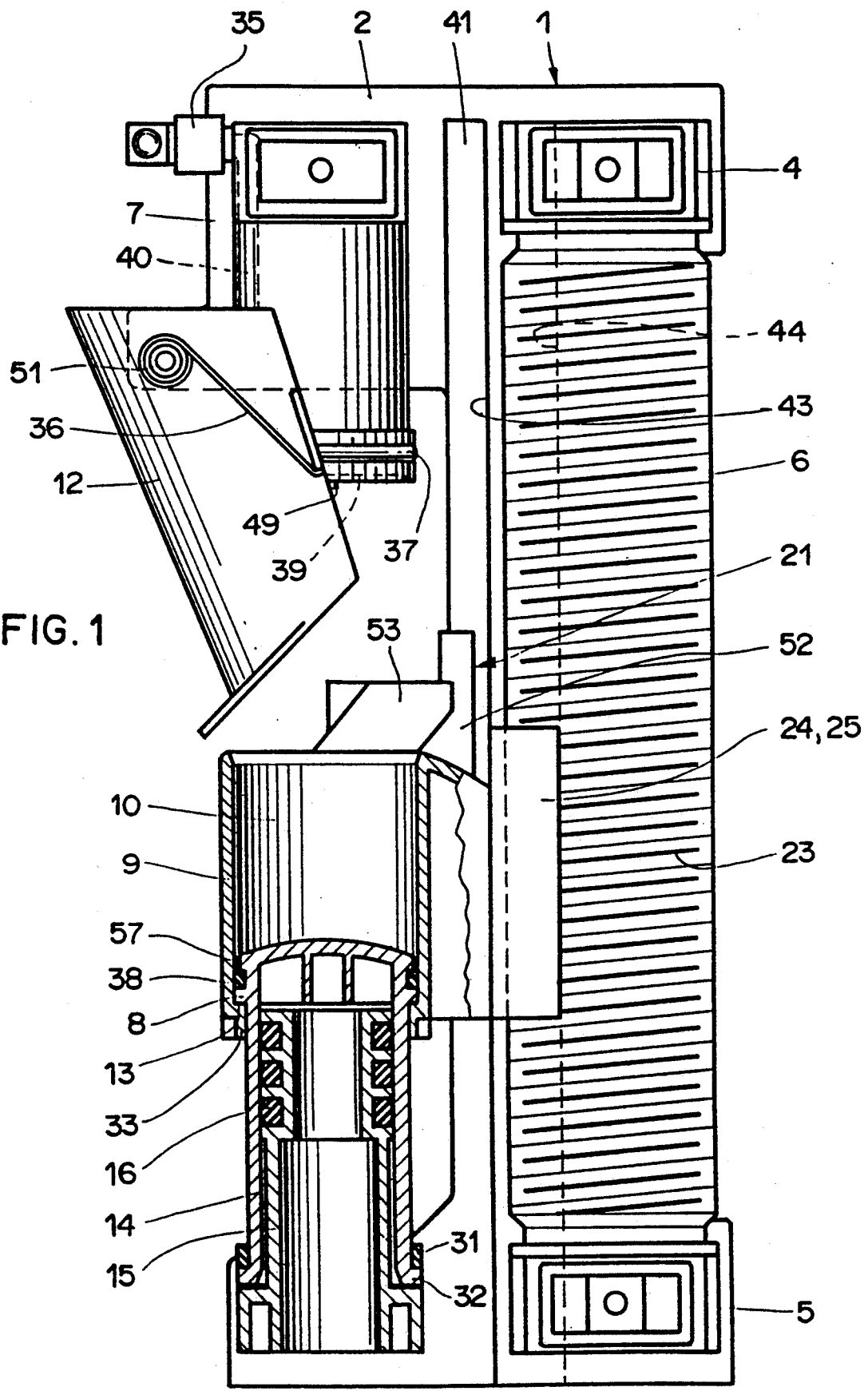
FIG. 1 shows a partial longitudinal section viewed from the side through a first embodiment of a brewing device according to the invention, presented in a first position, the filling position.
Figure 2:
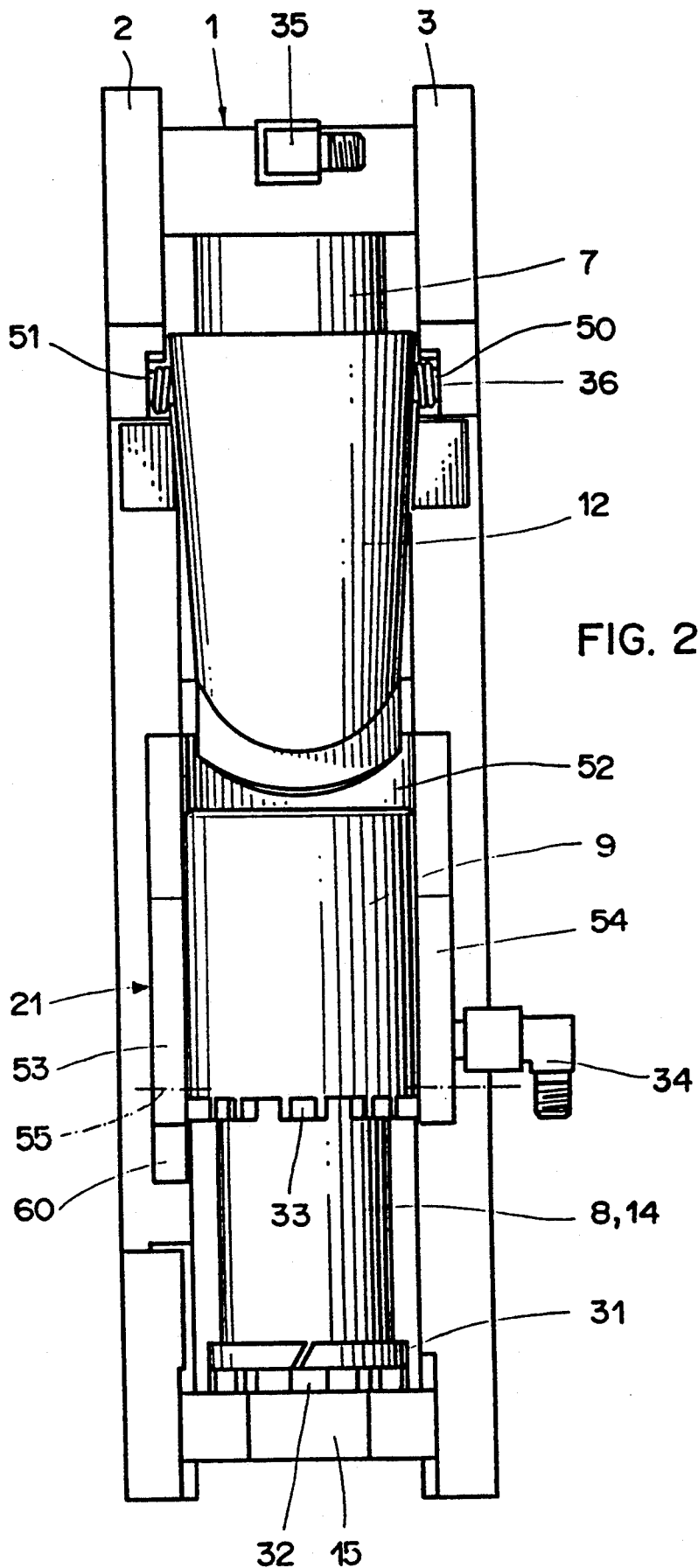
FIG. 2 shows a front view of the brewing device of FIG. 1, in the same position.
Figure 3:
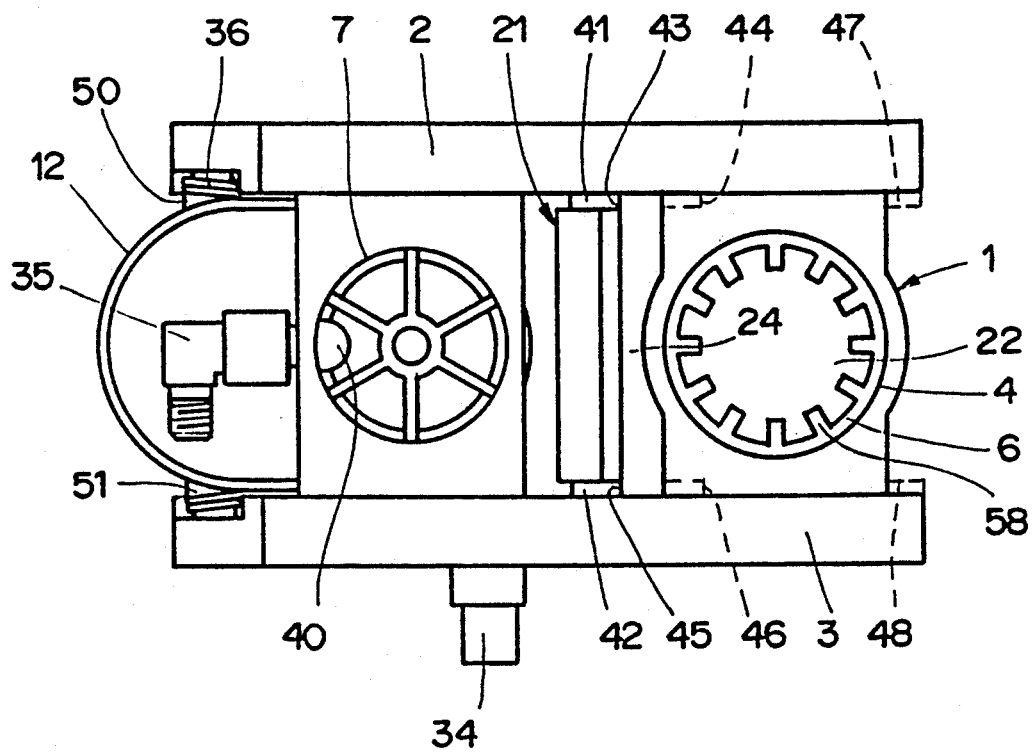
FIG. 3 shows a plan view of the brewing device of FIG. 1.

FIGS. 1, 2 and 3 show a first or preferred embodiment of the brewing device of the invention in a partial longitudinal section viewed from the side (FIG. 1), in a front view (FIG. 2) and a plan view (FIG. 3) in the resting or filling position. The essential operating components of the brewing device are shown in the figures. The brewing device comprises a frame 1, formed substantially by a first and a second side wall 2, 3, said side walls being distanced from each other by appropriate distancing means. Serving as distancing means are, amongst other things, an upper and a lower spindle bearing 4, 5 of a drive spindle 6 extending longitudinally over the entire device. The drive spindle is rotatably mounted in the spindle bearings and ensured against axial displacement. On drive spindle 6 there is a guide means 23, preferably disposed as a multiple spindle thread with a pitch of approximately 5 degrees. The spindle thread extends over the entire length of the drive spindle 6, whose working position is vertical. At a distance to the drive spindle 6, a brewing cylinder 9 is held longitudinally displaceable relative to the former. The brewing cylinder 9 has a through bore 10 whose axis runs parallel to the axis of the drive spindle 6. Rigidly connected with the brewing cylinder is a drive element 24 which extends to the drive spindle 6. The drive element 24 is constructed essentially plate-shaped, the side facing the drive spindle 6 comprises a further guide 25, which engages with guide means 23. The side portions of drive element 24 are each led between two guide surfaces 43, 44; 45, 46, formed by corresponding longitudinal guides 41, 47 on the first side wall 2, and 42, 48 on the second side wall 3. When the drive spindle 6 rotates in one or the other direction, the brewing cylinder is displaced upward or downward.

An upper piston 7 is rigidly connected with the frame. Its front face turned toward the brewing cylinder 9 is provided with a detachable sieve 39, held by means of a retaining catch 49. The surface of the upper piston, near sieve 39, is encompassed by a sealing ring 37. This is intended to seal the piston liquid-tightly with respect to the inner wall of bore 10 of brewing cylinder 9. The upper piston 7 comprises a long, hollow-cylinder-shaped shaft whose end turned away from sieve 39 is extended towards the two side walls 2, 3 , thereby allowing the upper piston 7 to also be used as a distancing means for the side walls 2, 3. A liquid pipe 40 passes within the hollow-cylinder-shaped shaft of upper piston 7 to behind sieve 39 from a connecting nipple 35 disposed on the aforementioned end of piston 7. Connecting nipple 35 can serve either to supply water or to remove coffee.

On the side turned away from upper piston 7, bore 10 of brewing cylinder 9 has inwardly directed cams 33 distributed uniformly around the circumference of bore 10. Each cam 33 forms an arresting edge 13 running at a right angle to the axis of the bore 10. Resting against these, according to the figure described here, is a lower piston 8 which is disposed in bore 10 of brewing cylinder 9 and is freely displaceable along essentially the entire brewing cylinder. The lower piston 8 also has a hollow-cylinder-shaped shaft 14 which extends away downward from brewing cylinder 9. At the lower end of shaft 14 there are outwardly directed cams 32, distributed over the circumference. These cams are intended to support a divided stop ring 31 which can be stretched over the shaft 14. The purpose of the ring is to prevent lower piston 8 from leaving brewing cylinder 9 upwardly. The outwardly directed cams on shaft 14 are disposed so that, to introduce the lower piston into brewing cylinder 9, they can be passed through between the centrally directed cams 33 of bore 10 of brewing cylinder 9, depending on the position of rotation of the piston. In the region of its front face situated in the brewing cylinder 9, lower piston 8 also has a sealing ring 38 serving the same purpose as already mentioned above. Coaxial to bore 10, respectively to lower piston 8, there is a hollow-cylinder-shaped connecting piece 15. Its end furthest away from brewing cylinder 9 is laterally enlarged and also serves as a distancing means for side walls 2, 3 already mentioned.

The hollow-cylinder-shaped shaft 14 of lower piston 8 can be pushed past connecting piece 15. A restricting means 16, consisting in the example shown of three O-rings 16 which encompass the connecting piece 15 positioned in corresponding grooves, ensures that the displacement of lower piston 8 is restricted or braked relative to connecting piece 15.

In the upper end region between the two side walls 2, 3, a hopper 12 is pivotably mounted for introducing coffee powder into brewing cylinder 9. To this end, each of side walls 2, 3 has an inwardly extending bearing journal 50, 51. At least one spring 36 ensures that hopper 12 assumes a position pivoted toward bore 10 in the resting or filling position.

Also disposed on brewing cylinder 9 is a stripping device 21. This is relatively difficult to see in FIGS. 1 to 3. Journals provided at the lower end of brewing cylinder 9 and directed towards side walls 2, 3, are intended to each support a lever 53, 54, pivotably mounted thereupon, of the stripping device 21. Levers 53, 54 extend to the upper end of the brewing chamber 9 and are rigidly connected with an ejection plate 52, which extends beyond the brewing cylinder at essentially a right angle to the brewing cylinder axis. Moreover, an additional connecting nipple 34 is disposed in the lower end area of the brewing cylinder, by means of which water can be supplied to brewing cylinder 9 or coffee can be drawn off. At connecting nipple 34, the wall of brewing cylinder 9 has a through bore extending at a right angle to bore 10. This is not visible in the figures. However, it is disposed so that in the filling position shown, it opens out just above sealing ring 38 of lower piston 8 into an annular gap 57 formed between bore 10 and the outer surface of lower piston 8.

The drive spindle 6 is also designed as a hollow spindle. At one of its end portions it has inwardly directed cams 58 intended to engage in appropriately formed grooves of a drive shaft 22 guided coaxially to the spindle. Although not shown in the figures, the drive shaft 22 is preferably connected with a drive motor via an angular gear.

The essential components of the brewing device having been described, the operation will now be explained as follows.

Figure 4:
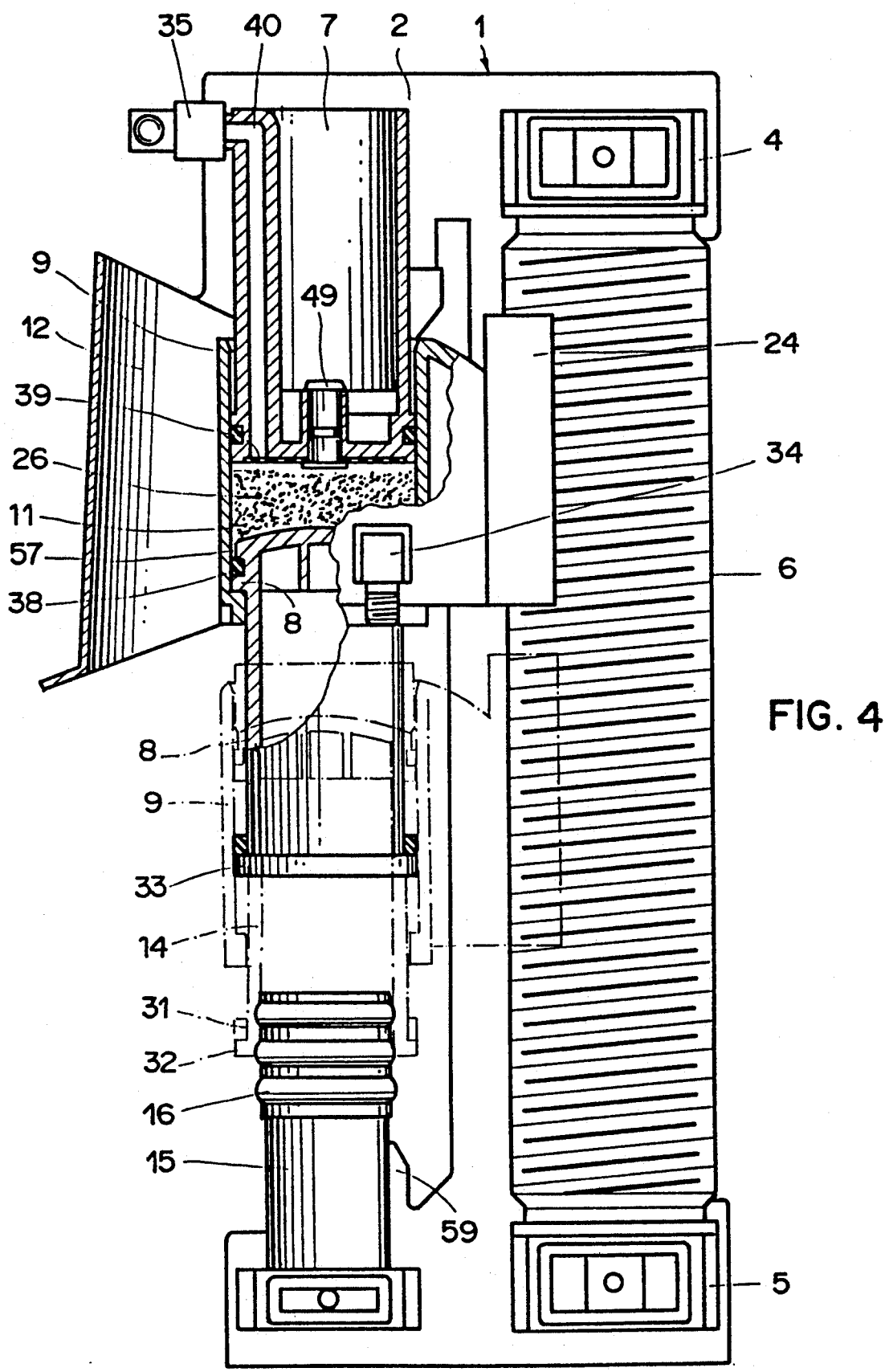
FIG. 4 is a longitudinal section through the brewing device of FIG. 1, shown in a second position, the loose brewing position, and the dot-dash line shows a third position in which the leached-out coffee powder is prepared to be ejected.

The filling position shown in FIG. 1 is the starting point. A certain amount of coffee powder enters the bore 10 of brewing cylinder 9 via pivoted hopper 12. The coffee powder is thereby uniformly distributed over the front end face of lower piston 8. Drive spindle 6 is rotated so that brewing cylinder 9 is displaced upwards. Lower piston 8, resting on stops 13, is displaced with it. Shaft 14 of lower piston 8 is thus displaced relative to fixed support 15. The upwardly moving brewing cylinder 9 runs up to the inclined underside of hopper 12 and thus pivots it outward into the position shown in FIG. 4.

As brewing cylinder 9 continues upward, its upper end is displaced beyond upper piston 7. Bore 10 of the brewing cylinder is thus closed at both ends and a brewing chamber 11 is formed. The upward movement of the brewing cylinder is for a set or predetermined time period, but continues at least until an equivalent force against the drive has been formed by the highly compressed powder between the undisplaceably disposed upper piston 7 and the lower piston 8. The quantity of powder inserted can be precisely determined in this way. At the end of the predetermined time period the drive spindle is driven briefly in the opposite direction and the brewing chamber 11 is slightly reopened. This is the so-called brewing position, shown in FIG. 4. The opening of the brewing chamber, which has just taken place, is equally large for any quantity of coffee powder inserted. Brewing takes place by supplying hot water to brewing chamber 11 via one of the two connecting elements 34, 35. This is preferably done via the first connecting element 34, which is disposed on brewing cylinder 9. The water enters brewing chamber 11 through annular gap 57, runs uniformly through the coffee powder 26, and leaves the brewing device as coffee via sieve 39, pipe 40 and other connecting element 35. Following the brewing process, brewing chamber 11 is reduced again by driving up brewing cylinder 9 to press out any liquid still inside. After pressing, brewing cylinder 9 is displaced downward by correspondingly rotating drive spindle 6. Due to the friction of the sealing ring 38 and the adhesion of the coffee powder 26, now leached out and pressed into a cake, lower piston 8 remains in its lower position for the time being. As brewing cylinder 9 moves downward, the lower end of the shaft 14 of lower piston 8 runs towards the upper end of support 15. Due to the blocking means, the O-rings 16, for example, the downward movement of lower piston 8 is now slower in relation to the downward movement of brewing cylinder 9. Inside bore 10, lower piston 8 is thereby displaced slowly towards the upper end of brewing cylinder 9. The coffee powder cake is gradually ejected from the brewing cylinder and remains resting on lower piston 8. The position of brewing cylinder 9 just described is shown by a dot-dash line in FIG. 4. As soon as the cams 33 of brewing cylinder 9 come to rest on the stop ring 31, the lower piston 8 continues downward at the same rate as the brewing cylinder 9. By this time at the latest, the coffee powder cake has been completely ejected from the brewing cylinder.

Figure 5:
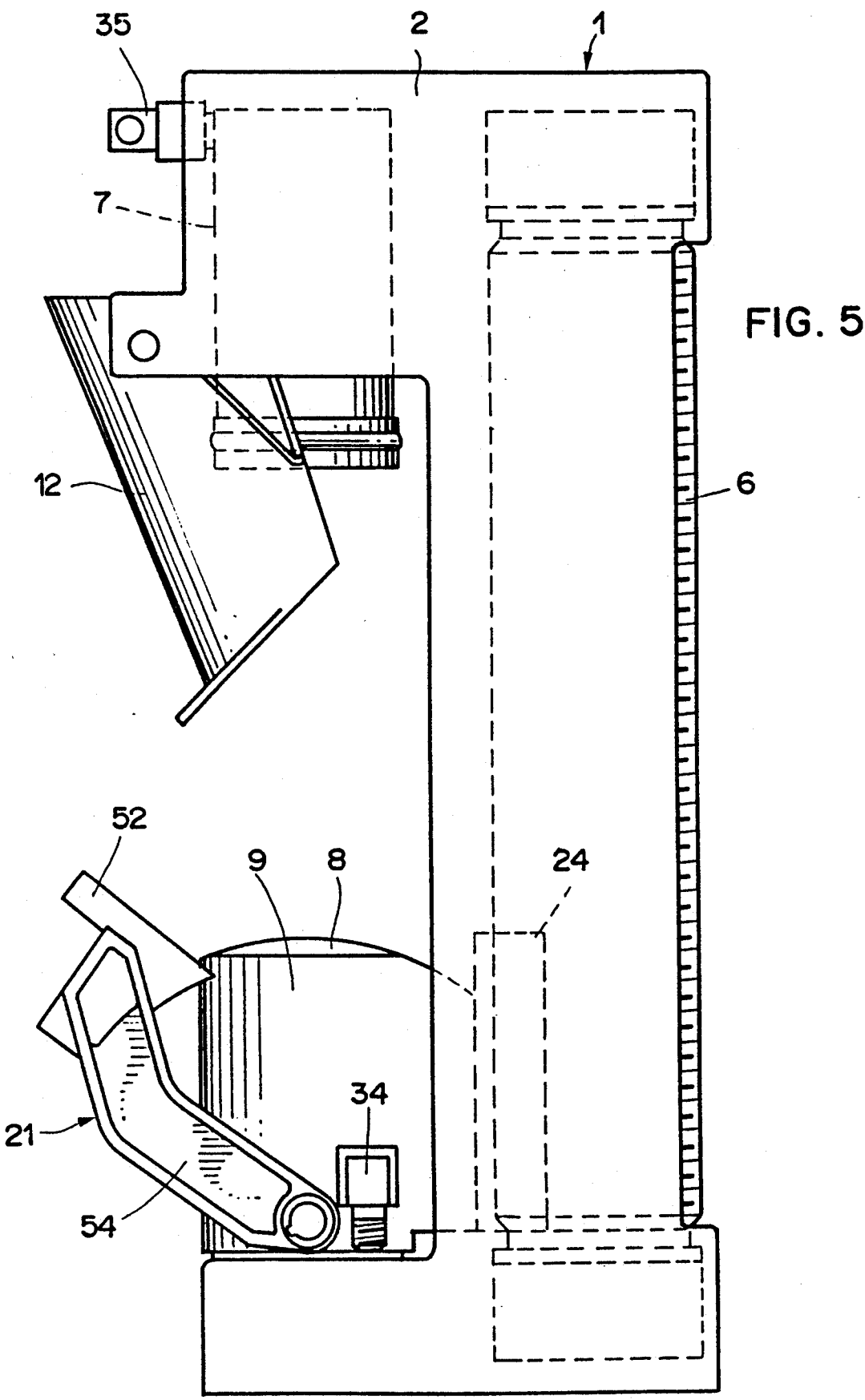
FIG. 5 is a longitudinal section through the brewing device of FIG. 1, in a fifth position after the leachedout coffee powder has been ejected.

The downward movement of brewing cylinder 9 is continued until cams 32 of shaft 14 come to rest on the enlargement of the lower end of connecting piece 15, serving as a distancing means. Shortly before, an inclining lever 60 (FIG. 2) of stripping device 12 ran against an operating projection 59, causing an ejector plate 52 to pivotably displace over the curved end face of lower piston 8. The cake of leached-out, pressed coffee powder is thereby removed from the brewing device. This position is shown in FIG. 5. It need scarcely be mentioned that as the brewing device 9 moved downward, the hopper automatically pivoted inward due to the force of the spring 36.

Brewing cylinder 9 is now displaced upward again into the filling position. At the beginning of this upward movement, stripping device 12 is pivoted inward again by means of the lever 60 (FIG. 2) and one of the longitudinal guides 41 on the side wall 2. The longitudinal guide 41 and the lever 60 are positioned in such a way with respect to each other that it is no longer possible to pivot the stripping device outward. The upward movement of lower piston 8 is temporarily halted by blocking means 16 (O-rings). I.e., it is slower than the upward movement of brewing cylinder 9. Lower piston 8 is thereby displaced relative to brewing cylinder 9 towards the arresting edge 13. Only when lower piston 8 comes to rest thereupon is its upward movement continued at the rate of the brewing cylinder 9, until it reaches the filling position.

All periods of time during which drive spindle 6 is operated in one or the other direction are time-controlled or predetermined. The result is that, by omitting corresponding end switches, the brewing device can be more simply constructed in comparison with prior art embodiments. Neither is a device for determining a particular prepressing of the coffee powder required. The upper piston can thereby be rigidly connected with the side walls 2, 3. All moveable parts of the brewing device are driven by one single motor.

All parts of the brewing device are preferably made of injection molded thermoplastic. When the figures are studied, it is striking how few individual parts make up the brewing device according to the present invention. The number of parts subject to wear and tear is minimal. This has an extremely positive effect on the period of time the device can be operated until a defect occurs. By the special means of supplying the water via the annular gap 57 at the lower piston 8, a relatively expensive sieve can be saved. Annular gap 57 is automatically cleaned by the incoming water during each brewing operation. The pitch of the spindle thread 23 on drive spindle 6 is selected so that when the drive motor is turned off, and at a high brewing pressure of approximately 10 bar in the brewing chamber 11 during the brewing process, the thread friction prevents the brewing cylinder 9 from moving downward. The drive device is designed to be self-blocking.

Figure 6:
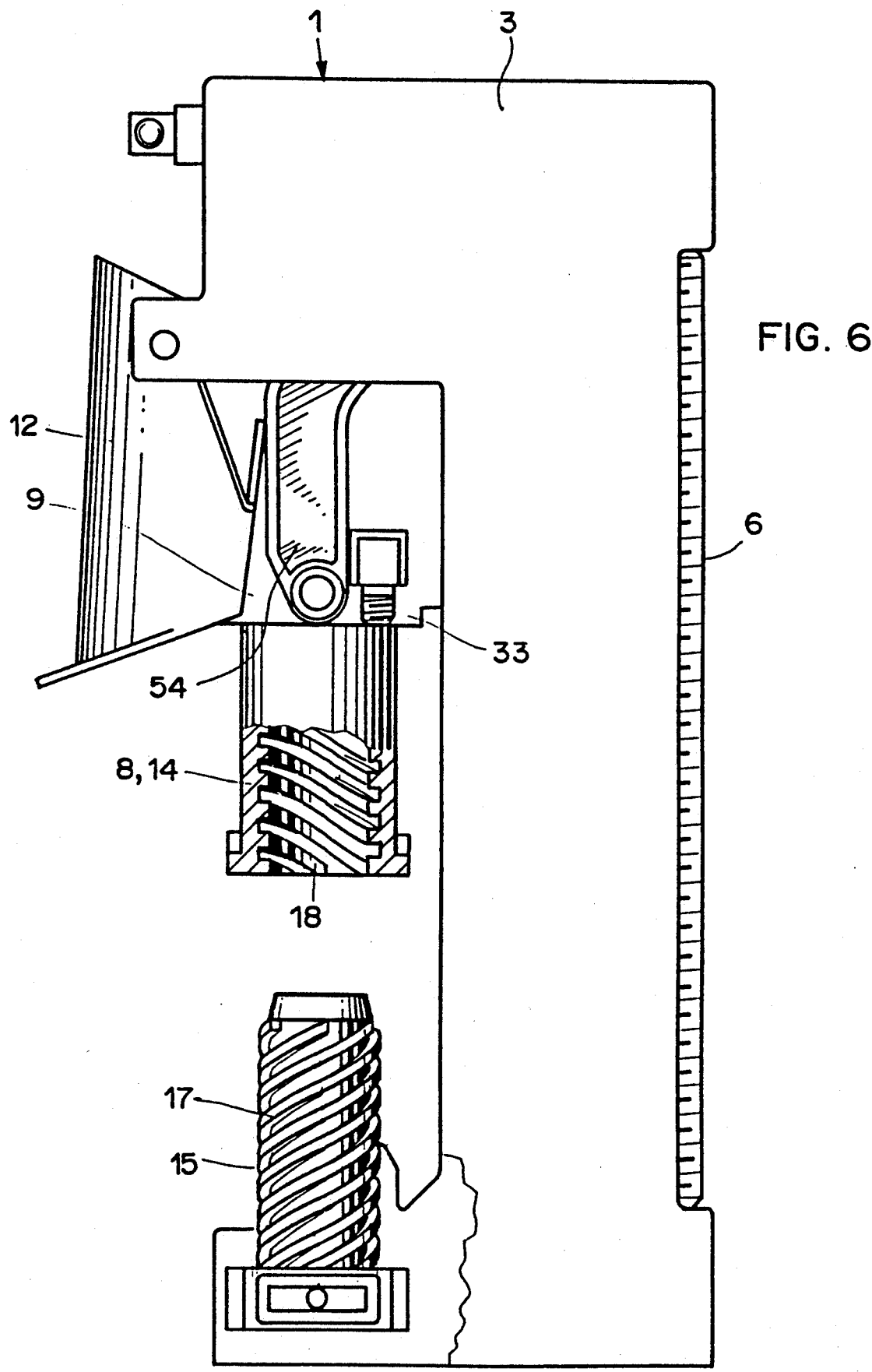
FIG. 6 shows in a further embodiment a longitudinal section through a brewing device according to the invention.
Figure 7:
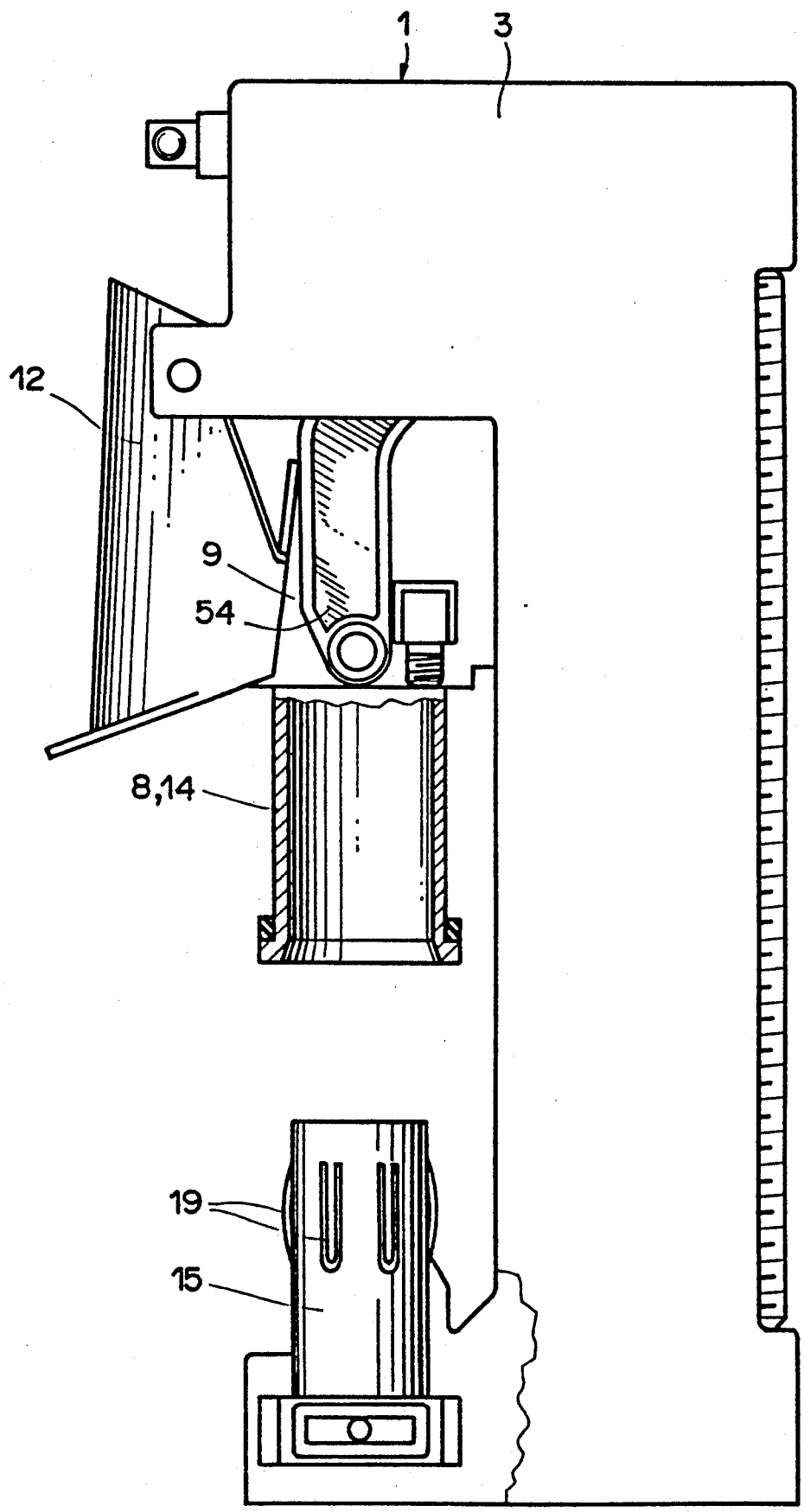
FIG. 7 shows in a third embodiment a longitudinal section through a brewing device according to the invention.
Figure 8:
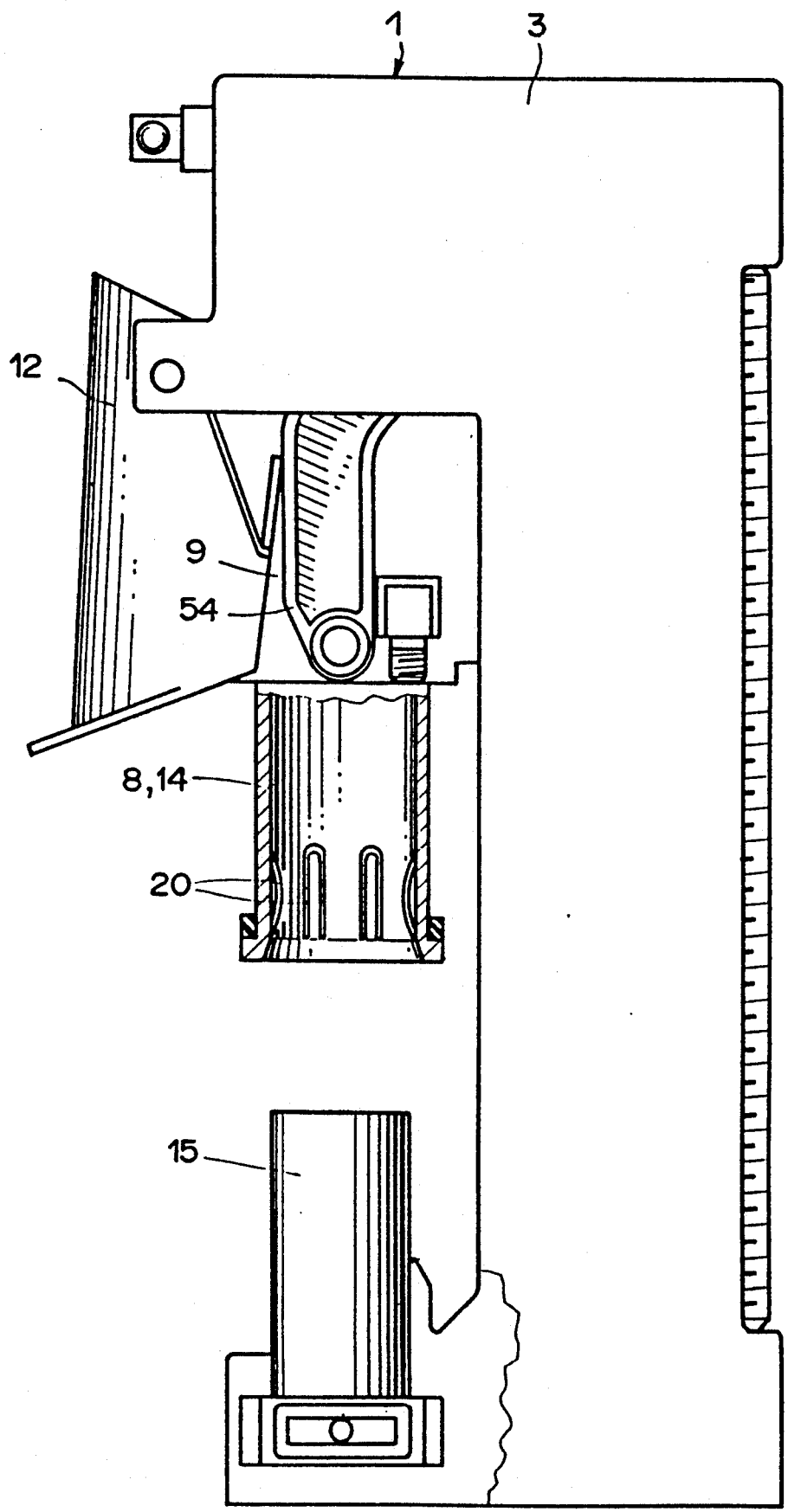
FIG. 8 shows in a fourth embodiment a longitudinal section through a brewing device according to the invention.

FIGS. 6, 7 and 8 show further embodiments with respect to the blocking means 17, 18 19, 20 of the brewing device according to the present invention. The blocking means constitute the only difference between the additionally illustrated brewing devices and those described above. Therefore parts which have already been described have deliberately not been referred to again.

In the second embodiment of a brewing device shown in FIG. 6, a multiple outer thread, not of coarse pitch, is disposed on connecting piece 15. There is a corresponding inner thread inside shaft 14 of lower piston 8. Because the threads of both the outer thread and the inner thread do not end at an inclination to the longitudinal axis of the connecting piece 15 and respectively the shaft 14, but parallel to this axis, a self-centering of the thread always occurs when shaft 14 meets connecting piece 15 when brewing cylinder 9 moves downward. The pitch of the threads 17, 18 is selected so that due to the friction of the thread, the movement of lower piston 18 is temporarily halted until it is moved again by the brewing cylinder at the same rate as the brewing cylinder, depending on which side of the shaft the cams 33 come to rest. Blocking is understood as a temporary slowing down of the movement as well as a temporary halt, or a combination thereof.

A third brewing device is shown in FIG. 7. The connecting piece 15 comprises as blocking means outwardly bent tongues 19 which extend in the longitudinal direction over a portion of connecting piece 15. In order to prevent a twisting of the shaft 14 to the connecting piece 15, preferably at least three protrusions 19, which can be flexibly compressed, are evenly distributed around the circumference of connecting piece 15.

FIG. 8 shows a fourth brewing device. The compressible flexible protrusions 20 are disposed inside the hollow cylindrical-shaped shaft 14. From essentially the lower end of shaft 14, they extend over a portion longitudinally to the axis of the shaft. In this case it is not necessary to shape connecting piece 15 in any special way which differs from the outer cylindrical form.

What is claimed is:

1. Brewing device for a coffee machine comprising a vertically disposed brewing cylinder (9) having a cylindrical bore (10), upper and lower pistons (7, 8) closing the cylindrical bore (10) to form a brewing chamber (11), said brewing cylinder (9) and said lower piston (8) being displaceable relative to one another and the upper piston (7) along a brewing cylinder axis, said brewing cylinder (9) having an upper and lower end and being movable in the vertical direction, a frame (1) for supporting said brewing device, said upper piston (7) being fixed to said frame (1), a pivotable hopper (12) for introducing coffee powder into the bore at the upper end of the brewing cylinder, said lower piston (8) being disposed freely displaceably along the bore (10) of the brewing cylinder (9) and having a hollow cylinder-shaped shaft (14) with an inner surface facing away from the brewing cylinder (9), retaining stop means located at the lower end of the brewing cylinder for retaining the lower piston (8) in the bore (10) of the brewing cylinder (9), a cylinder-shaped connecting piece (15) fixed to the frame (1) situated opposite the upper piston and having an outer surface for guiding the inner surface of the lower piston shaft (14) when the brewing cylinder moves downward, blocking means (16, 17, 18, 19, 20) between said inner surface and said outer surface for temporarily blocking relative movement of the lower piston (8) with respect to the brewing cylinder, a stripping device (21) for removing coffee remaining on the lower piston, and means for activating said stripping device as soon as the upper end of the brewing cylinder (9) by its downward movement is essentially flush with an upper end face of the lower piston (8).

2. Device according to claim 1, further comprising a drive device (19) having a single drive spindle (6).

3. Device according to claim 2, further comprising a drive element (24) disposed on the brewing cylinder (9) and having guide means (25), said drive spindle (6) being mounted rotatably on the frame (1) and extending parallel to the brewing cylinder (9) and having guide means (23) extending helically over substantially its entire length, said drive element and drive spindle guide means (23, 25) being operatively connected together for displacing the brewing cylinder (9) and retaining the brewing cylinder in a fixed position when water is supplied under pressure to the brewing chamber (12).

4. Device according to claim 1, said blocking means comprising at least one O-ring (16) affixed to the outer surface of the connecting piece, friction between the O-ring (16) on the outer surface of the connecting piece (15) and the inner surface of the lower piston (8) being greater than friction of the lower piston (8) inside the bore (10) of the brewing cylinder (9).

5. Device according to claim 1, said blocking means comprising at least one outwardly projecting, compressible, flexible protrusion (19) extending longitudinally over a portion of the connecting piece (15).

6. Device according to claim 1, said blocking means comprising at least one inwardly projecting, compressible, flexible protrusion (20) extending in the longitudinal direction over a portion of the shaft (14).

7. Device according to claim 1, said blocking means comprising a multiple thread (17, 18) on the connecting piece (15) and inside the shaft (14), said threads (17, 18) being self-centering and having a pitch such that the movement of the lower piston is blocked over the length of the thread with respect to the brewing cylinder.

8. Method for producing coffee with a brewing device for a coffee machine comprising a vertically disposed brewing cylinder (9) having a cylindrical bore (10) and upper and lower pistons (7, 8) mounted within and closing the cylindrical bore to form a brewing chamber (11), the brewing cylinder (9) and the lower piston (8) being displaceable relative to one another and the upper piston (7) along a brewing cylinder axis, comprising the steps of positioning the upper piston (7) outside the bore (10) of the brewing cylinder (9), inserting coffee powder into the bore and substantially uniformly distributing said coffee powder over an end face of the lower piston (8) within said bore, displacing the brewing cylinder (9) and the lower piston (8) upward for a predetermined time to reduce the volume of the brewing chamber (11) until it corresponds to the volume of the coffee powder inserted (26), displacing the brewing cylinder (9) downward by a predetermined amount to enlarge the brewing chamber volume, supplying hot water to the brewing chamber (11) to loose-brew the coffee powder and produce coffee, drawing off the coffee produced, displacing the brewing cylinder (9) upward to press the exhausted coffee powder into a cake (27), displacing the brewing cylinder (9) and the lower piston (8) downward, said lower piston being blocked by blocking means (16, 17, 18, 19, 20) to make its downward movement temporarily slower than that of the brewing cylinder (9) for ejecting the cake (27) out an upper end of the brewing cylinder (9), stripping said cake (27) off the end face of the lower piston (8), and displacing the brewing cylinder (9) upward to position the upper piston (7) outside the bore (10) of the brewing cylinder (9), said lower piston (8) being blocked by the blocking means (16, 17, 18, 19, 20) to make its upward movement temporarily slower than that of the brewing cylinder (9).

9. Device according to claim 8, said predetermined time being a period of time required for the brewing cylinder (9) and the lower piston (8) to displace upward and reduce the volume of the brewing chamber (11) to correspond with the volume of a smallest amount of insertable coffee powder.

10. Device according to claim 8, said brewing cylinder (9) and said lower piston (8) being stopped before the end of said predetermined time if an equally great downwardly force counteracts an upwardly directed drive force.

* * * * *

UNITED STATES PATENT AND TRADEMARK OFFICE
CERTIFICATE OF CORRECTION

PATENT NO. : 5,316,781

DATED : May 31, 1994

INVENTOR(S) : Andre Lussi; Hans Zurbuchen; and Jurg von Gunten

It is certified that error appears in the above-identified patent and that said Letters Patent is hereby corrected as shown below:

In the Abstract, line 18, after "spindle" insert --.--;

Column 1, line 22, after "to" insert --the--;
Column 1, line 62, after "reducing" insert --brewing--;

Column 2, line 34, "thus" should read --this--;
Column 2, line 39, "be also" should read --also be--;
Column 2, line 46, "produced" should read --producing--;

Column 6, lines 65-66, "respectively" should be deleted;

Column 8, line 57, "Device" should read --Method--;
Column 8, line 64, "Device" should read --Method--.

Signed and Sealed this

Eleventh Day of October, 1994

Attest:

BRUCE LEHMAN

Attesting Officer

Commissioner of Patents and Trademarks